(12) United States Patent
Jiang et al.

(10) Patent No.: US 11,520,809 B2
(45) Date of Patent: Dec. 6, 2022

(54) CHECKPOINT MANAGEMENT IN A DATABASE SYSTEM

(71) Applicant: International Business Machines Corporation, Armonk, NY (US)

(72) Inventors: Peng Hui Jiang, Beijing (CN); Meng Wang, Beijing (CN); Jun Su, Beijing (CN); Douglas J. Cowie, Warminster (GB); Li Jia Meng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 17/226,130

(22) Filed: Apr. 9, 2021

(65) Prior Publication Data

US 2022/0327144 A1    Oct. 13, 2022

(51) Int. Cl.
*G06F 16/00* (2019.01)
*G06F 16/27* (2019.01)
*G06F 11/34* (2006.01)
*G06F 16/25* (2019.01)
*G06F 16/84* (2019.01)

(52) U.S. Cl.
CPC ........ *G06F 16/278* (2019.01); *G06F 11/3476* (2013.01); *G06F 16/256* (2019.01); *G06F 16/86* (2019.01)

(58) Field of Classification Search
CPC .. G06F 16/256; G06F 16/278; G06F 16/3476; G06F 16/86
See application file for complete search history.

(56) References Cited

U.S. PATENT DOCUMENTS

| 8,433,863 | B1 | 4/2013 | Orcutt |
| 8,527,650 | B2 * | 9/2013 | Craft .................. G06F 11/1438 709/223 |
| 9,898,581 | B2 | 2/2018 | Lutzen |

(Continued)

FOREIGN PATENT DOCUMENTS

| KR | 101451807 B1 | 7/2014 |
| WO | 2020207010 A1 | 10/2020 |

OTHER PUBLICATIONS

Bohora et al., "Backup and Recovery Mechanisms of Cassandra Database: A Review", Journal of Digital Forensics, Security and Law, vol. 15, Article: 5, Feb. 2021, 12 Pages.

(Continued)

*Primary Examiner* — Diedra McQuitery
(74) *Attorney, Agent, or Firm* — Stephanie L. Carusillo

(57) ABSTRACT

In an embodiment of the present invention, a checkpoint is received, the checkpoint indicating at least one source position of unprocessed object(s) of a plurality of objects on at least one source shard in a database system. In response to detecting a shard change related to the checkpoint to the at least one source shard, the shard change resulting in that the at least one source shard is updated to at least one destination shard, a mapping view is generated for representing position change of the unprocessed object(s) related to the shard change. An updated checkpoint is determined for indicating the at least one destination position of the unprocessed object(s) of the plurality of objects on at least one destination shard in the database system based on the mapping view. With these embodiments, the checkpoint may be managed in a more effective way.

20 Claims, 7 Drawing Sheets

(56) References Cited

U.S. PATENT DOCUMENTS

| | | | |
|---|---|---|---|
| 10,289,804 B2 | 5/2019 | Chapman | |
| 2008/0162651 A1* | 7/2008 | Madnani | H04L 67/01 |
| | | | 709/206 |
| 2013/0218921 A1* | 8/2013 | Palay | G06F 16/3334 |
| | | | 707/769 |
| 2019/0114719 A1 | 4/2019 | Brekka | |
| 2019/0171532 A1 | 6/2019 | Abadi | |
| 2019/0179918 A1 | 6/2019 | Singh | |
| 2020/0034933 A1 | 1/2020 | Rolih | |
| 2020/0104378 A1* | 4/2020 | Wagner | G06F 9/546 |
| 2021/0034471 A1 | 2/2021 | Khandkar | |

OTHER PUBLICATIONS

Georgiou et al., "Hihooi: A Database Replication Middleware for Scaling Transactional Databases Consistently", arXiv:2003.07432v2 [cs.DB], Mar. 22, 2020, 16 Pages.

Anonymous, "Using Apache HBase to store and access data", Hortonworks, Date of Publish: Dec. 17, 2019, 49 Pages, <<https://docs.cloudera.com/HDPDocuments/HDP3/HDP-3.1.5/hbase-data-access/hdag-Using-HBase-to-store-and-access-data.pdf>.

Apache Software Foundation, "Apache Cassandra", The Apache Software Foundation, 2016, 14 Pages, <<https://cassandra.apache.org/doc/latest/operating/backups.html>.

Mongodb, "Glossary", MongoDB, Inc., Accessed on Mar. 26, 2021, 19 Pages, <<https://docs.mongodb.com/manual/reference/glossary/>.

\* cited by examiner

CHECKPOINT MANAGEMENT IN A DATABASE SYSTEM

BACKGROUND

The present invention relates to a database system, and more specifically, to tracking a checkpoint for shard(s) in a database system.

Nowadays, a database system may comprise multiple storage nodes for providing service for various types of data. As the amount of data in a database grows, data in the database system may be partitioned into a plurality of shards for providing effective management. For example, the data may be stored into shards based on a hash of a keyword of the data, a timestamp of the data, and so on. Therefore, each shard may comprise a less amount of data so that the data in each shard is easily to be managed.

SUMMARY

According to embodiments of the present invention, there is provided a computer-implemented method that may be implemented by one or more processors. In the method, one or more processors receive a checkpoint, the checkpoint indicating at least one source position of unprocessed object(s) of a plurality of objects on at least one source shard in a database system. In response to detecting a shard change related to the checkpoint to the at least one source shard, one or more processors generate a mapping view for representing a position change of the unprocessed object(s) related to the shard change. Here, the shard change results in that the at least one source shard is updated to at least one destination shard. Further, one or more processors determine an updated checkpoint for indicating the at least one destination position of the unprocessed object(s) of the plurality of objects on at least one destination shard in the database system based on the mapping view.

According to another embodiment of the present invention, there is provided a computer-implemented system. The computer-implemented system comprises a computer processor coupled to a computer-readable memory unit, where the memory unit comprises instructions that when executed by the computer processor implements the above method.

According to another embodiment of the present invention, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
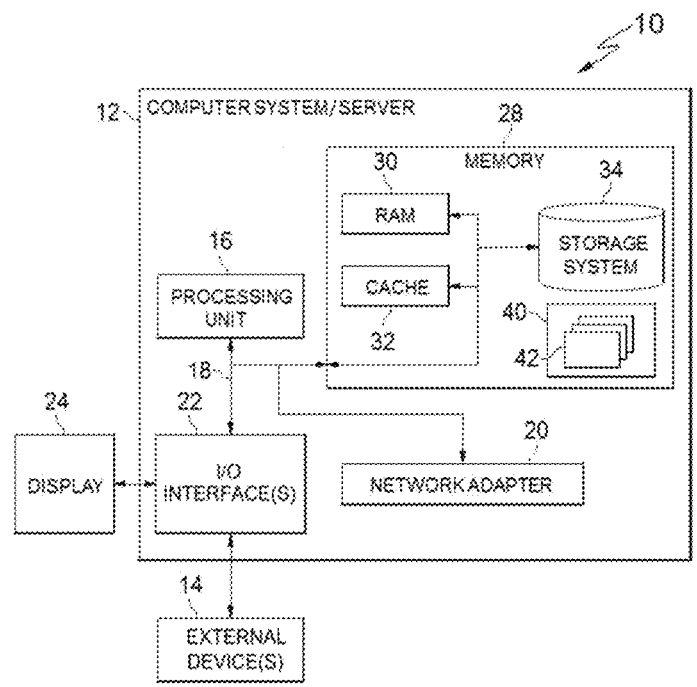
FIG. 1 depicts a cloud computing node, according to embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
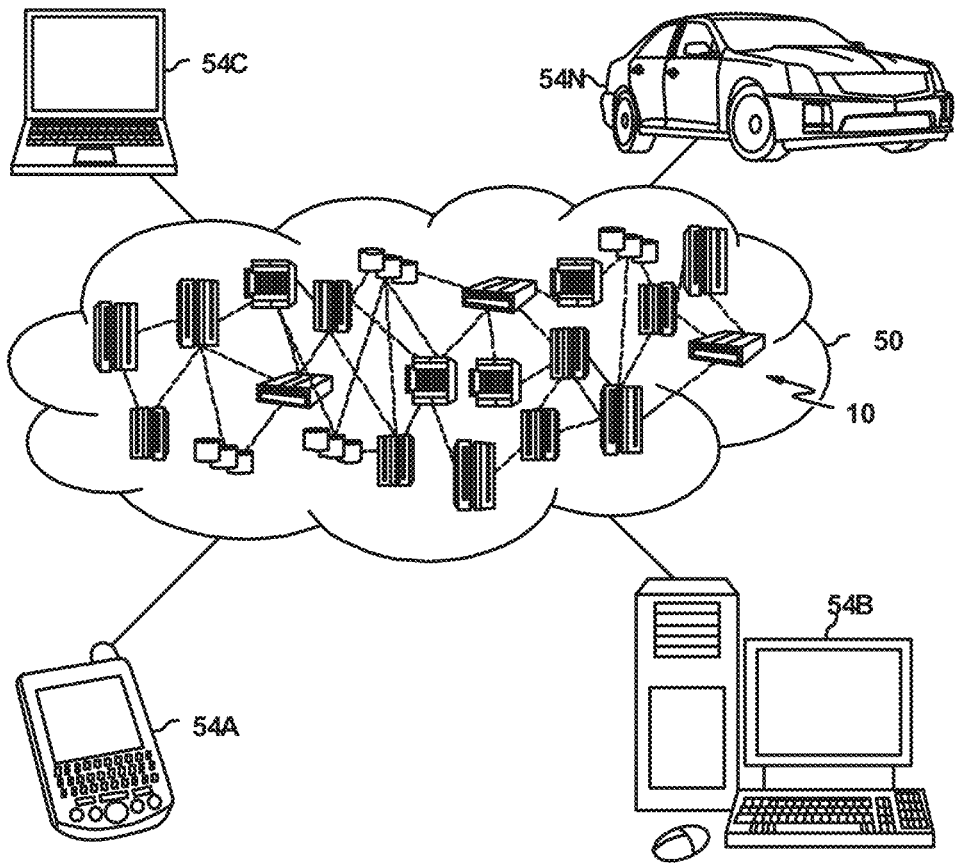
FIG. 2 depicts a cloud computing environment, according to embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
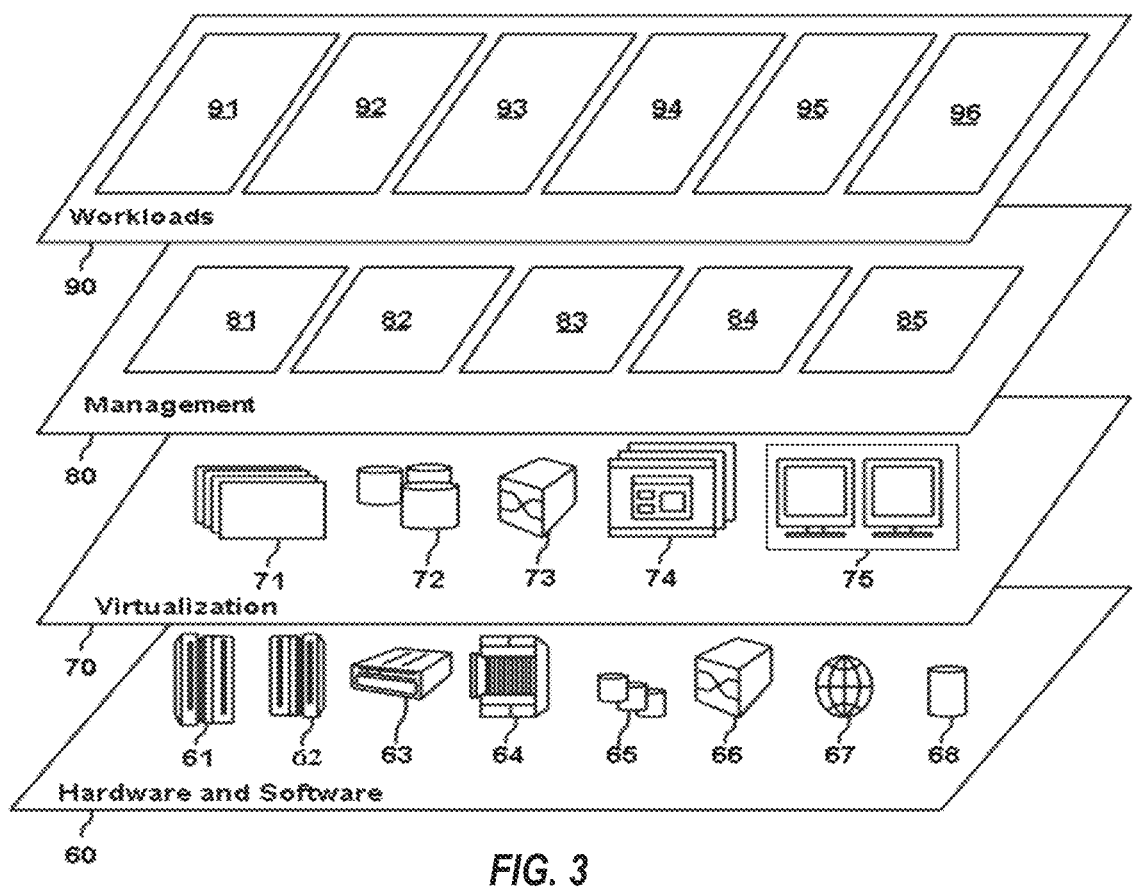
FIG. 3 depicts abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the checkpoint management processing 96.

As mentioned before, data is managed by shard(s) in a database system. During operations of the database system, a re-sharding procedure may be implemented, where one shard may be split into more shards, two or more shards may be merged into one shard, or one shard may be moved from a storage node to another. At this point, how to track a checkpoint for the shard(s) and provide effective and reliable service to the user becomes a hot focus.

Figure 4:
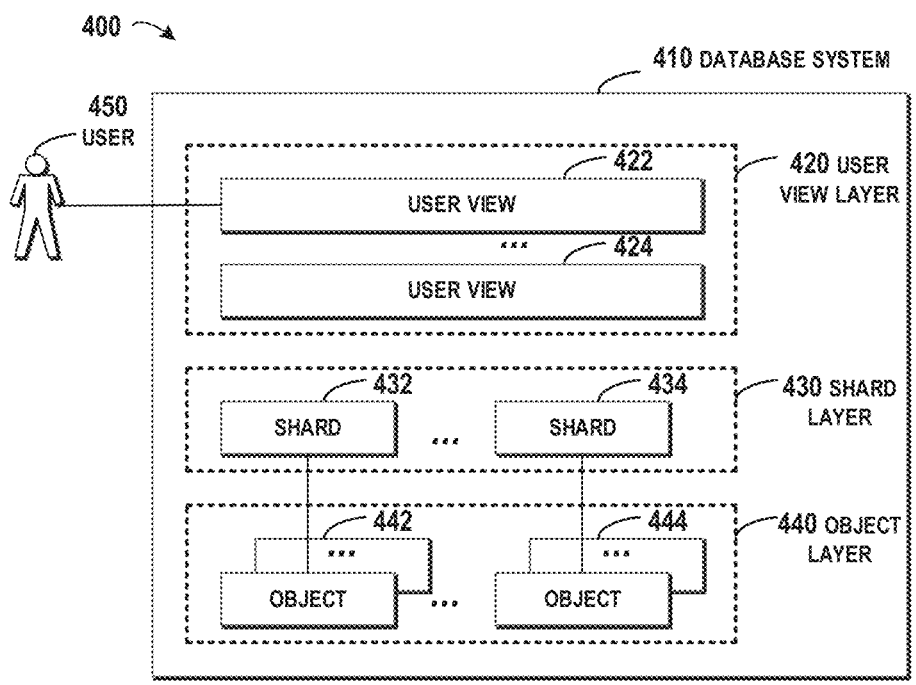
FIG. 4 depicts an example database system, according to embodiments of the present invention.

It should be noted that checkpoint management processing 96 of FIG. 3 could be implemented by computer system/server 12 of FIG. 1, according to embodiments of the present invention. A working environment of the present invention will be described below with reference to FIG. 4, which depicts an example environment 400 including an example database system 410 according to embodiments of the present invention. In FIG. 4, a user 450 may access the database system 410; here the database system 410 is managed in three layers, i.e., a user view layer 420, a shard layer 430, and an object layer 440. The user view layer 420 may provide multiple user views 422, . . . , and 424 for a plurality of users of the database system 410, respectively. The shard layer 430 may include a plurality of shards 432, . . . , and 434, and the object layer 440 may include a plurality of objects stored in various shards. For example, a plurality of objects 442 are stored in the shard 432, . . . , and a plurality of objects 444 are stored in the shard 434.

During operations of the computer system, the user 450 may access objects in the database system 410. The database system 410 may provide various functions, for example, the database system 410 may store news reports collected from other websites and provide the user 450 with the latest news around the world. At this point, the objects may comprise the collected new reports. The user 450 may mark a report as processed after he/she reads the report. Therefore, a checkpoint may be defined for indicating one or more new reports that are not read by the user 450. For example, the checkpoint may point to the last news report that is read. In another example, the checkpoint may point to the first news report that is not read.

Depending on a workload or another criterion for the database system 410, shards 432, . . . , and 434 may be resharded. For example, after a checkpoint has been defined by a user, due to state changes in the database system 410 and/or other reasons, a shard may be split into two or more new shards, a shard may be merged with another shard, or a shard may be moved from one storage node in the database system 410 to another storage node. Here, after the above resharding procedure, the object distribution may vary in the shards, which in turn makes the existing checkpoint unable to distinguish a boundary between the unread news reports and the read news reports. At this point, the existing checkpoint is useless and additional operations should be implemented for determining an updated checkpoint to indicate which report is unread and which report is read.

It is to be understood that the above paragraph just provides an example of the database system 410 storing new reports. In another, the database system 410 may store other types of objects such as emails, images, and the like. Although the above paragraph describes the checkpoint by taking the unread news reports as examples of the unprocessed objects, alternatively, the unprocessed object may involve other objects that are not subject to a predefined procedure such as an encoding procedure, a decoding procedure, an incremental backup procedure, a compressing procedure, and the like.

Figure 5:
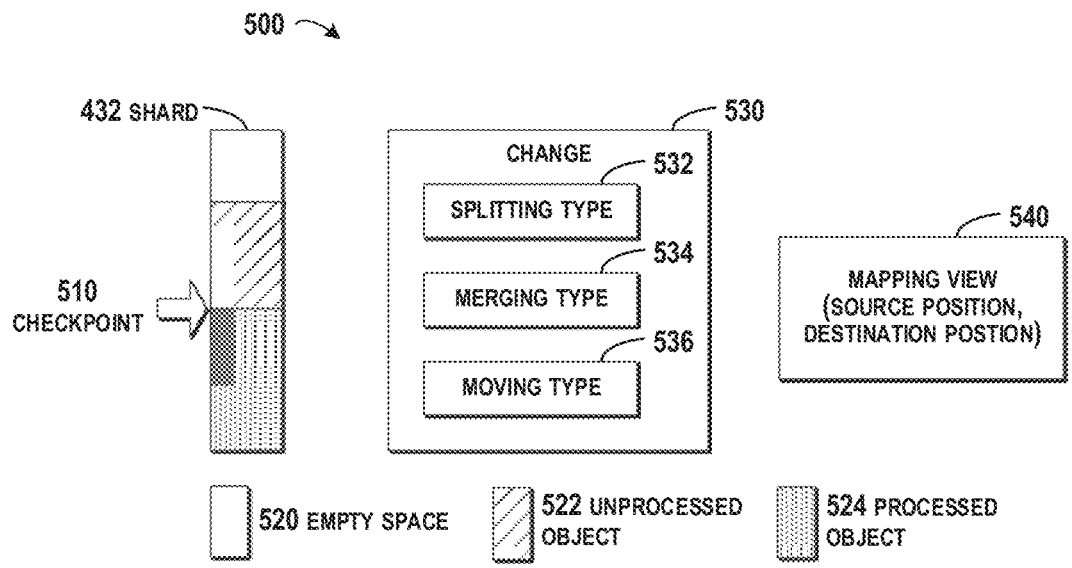
FIG. 5 depicts an example procedure for managing a checkpoint in a database system, according to embodiments of the present invention.

In view of the above drawbacks, embodiments of the present invention provide solutions for managing a checkpoint in the database system 410. FIG. 5 depicts an example procedure 500 for managing a checkpoint in a database system according to embodiments of the present invention. As shown in FIG. 5, a checkpoint 510 comprises a position which distinguishes unprocessed objects (represented by legend 522) and processed objects (represented by legend 524) on the shard 432. As represented by legend 520, a blank area in the shard 432 is used to indicate an empty space storing nothing. Although the checkpoint 510 illustrated in FIG. 5 relates to only one shard, alternatively, the checkpoint 510 may comprise two or more above positions on two or more shards.

During operations of the database system 410, a change 530 may be caused by the resharding procedure in the shard 432. For example, the change 530 may include a splitting type 532, a merging type 534, and a moving type 536. In order to ensure that the checkpoint still works after the change 530, a mapping view 540 may be obtained for representing a position change of the unprocessed objects in the shard 432. Specifically, the mapping view 540 may comprise a mapping between source position(s) of the unprocessed objects before the change 530 and destination position(s) of the unprocessed objects after the change 530. Further, the mapping view 540 may be used for determining an updated checkpoint for indicating the unprocessed objects on related shard(s) after the change 530. With these embodiments, the position change of the unprocessed objects may be recorded in the mapping view 540, and then the mapping view 540 may provide information about the updated checkpoint for further processing. Based on the updated checkpoint, the user may continue to read the unread news reports.

Figure 6:
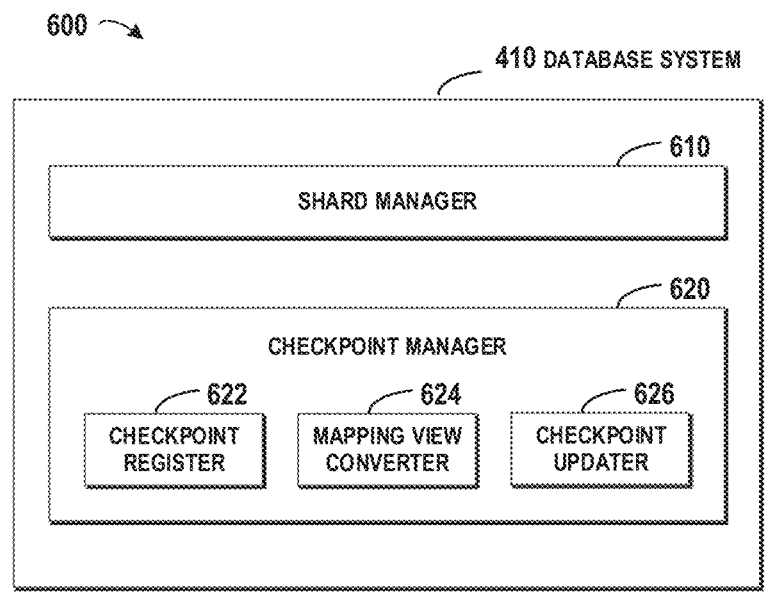
FIG. 6 depicts an example diagram including components for managing a checkpoint in a database system, according to embodiments of the present invention.

FIG. 6 depicts an example diagram 600 including components for managing a checkpoint in a database system according to embodiments of the present invention. As depicted in FIG. 6, the database system 410 may include a shard manager 610 that provides existing management procedures for the shards. Further, the database system 410 may include a checkpoint manager 620 for managing checkpoints. Although the checkpoint manager 620 is included in the database system 410, alternatively and/or in addition to, the checkpoint manager 620 may be deployed in another location outside the database system 410. The checkpoint manager 620 may include a checkpoint register 622, a mapping view converter 624, and a checkpoint updater 626.

In the checkpoint manager 620, the checkpoint register 622 may receive a checkpoint, the checkpoint is used to indicate at least one source position of unprocessed object(s) of a plurality of objects on at least one source shard in a database system. Information of the checkpoint may comprise an address of the at least one source shard (for example, the address may be indicated by an identification of the source shard) in the database system and at least one address related to unprocessed object(s) on the at least one source shard. Continuing the example of FIG. 5, the checkpoint 510 may be received. The checkpoint 510 may be defined in various formats, for example, the checkpoint 510 may comprise an address of a last processed object in the plurality of objects. Here, the plurality of objects is processed continuously, and a source position of at least one unprocessed objects on a shard may be represented by an address of a last processed object of the plurality of objects on the shard 432. At this point, a first object in the at least one unprocessed object is immediately subsequent to the last processed object. In some embodiments of the present invention, one checkpoint may be defined for unprocessed objects that are stored in a single shard or more shards. The following paragraph will describe the checkpoint management processing by taking one shard as an example, and all the shards related to the checkpoint may be processed in a similar manner In embodiments of the present invention, Table 1 illustrates an example checkpoint related to a single shard, and Table 2 illustrates an example checkpoint for a user having unprocessed objects that are distributed among a plurality of shards. In Table 1, "node1" represents an identification of a storage node on which the shard is located, 10,5368709111" represents an address range of the shard. "105" represents a position where the last processed object is located, therefore, the first unprocessed object is located at 105+1=106). Alternatively and/or in addition to, the source position may represent an address of the first unprocessed objects.

"2a9602a" represents a hash associated with the object, and "db@node1" represents that the node is in a database named "db." Lines in Table 2 have the same meaning as that in Table 1, and each line corresponds to a shard where the user's unprocessed objects is located. As shown in Table 2, the user's unprocessed objects are distributed among 8 shards (each line corresponds to a shard). Although Tables 1 and 2 show that the shard is identified by the address range, the shard may also be identified by other manners, such as by an indicator.

TABLE 1

Example Checkpoint for Single Shard

{node1,[0,536870911], {105,<<"2a9602a">>,db@node1}}

TABLE 2

Example Checkpoint for User

[{node1,[0,536870911], {105,<<"2a9602a">>,db@node1}},
{node1,[536870912,1073741823], {89,<<"a093878">>,v}},
{node1,[1073741824,1610612735], {88, <<"0979abc">>,db@node1}},
{node1,[1610612736,2147483647], {76,<<"fa6ef9a">>,db@node1}},
{node1,[2147483648,2684354559], {123,<<"b959591">>,db@node1}},
{node1,[2684354560,3221225471], {102,<<"cef193e">>,db@node1}},
{node1,[3221225472,3758096383], {43,<<"6d2f0e4">>,db@node1}},
{node1,[3758096384,4294967295], {63,<<"497d682">>,db@node1}}].

It is to be understood that, each line in Table 2 may be processed in a similar manner and hereinafter more details are provided by taking only one shard as an example. The mapping view converter 624 obtains the mapping view 540 for representing a position change of the unprocessed object(s) related to the shard change in response to detecting a shard change related to the checkpoint to the at least one source shard, the shard change resulting in that the at least one source shard related to the checkpoint is updated to at least one destination shard. Here, the mapping view 540 may be generated based on position(s) of the unprocessed objects(s) before and after the shard change. The mapping view converter 624 may be triggered by the shard manager 610. For example, information related to the shard change may be obtained from the shard manager 610, here the information comprises a type of shard change and addresses of related shard subsets. Specifically, the related shard subsets include a source shard subset of the at least one source shard and a corresponding destination shard subset of the at least one destination shard related to the shard change.

Further, source position(s) of unprocessed object(s) on the source shard subset before the change may be determined based on the checkpoint, and destination position(s) of unprocessed object(s) on the corresponding destination shard subset after the shard change may be determined based on information related to the shard change. Afterwards, a position change may be determined between the determined position(s) before and after the change, and then the mapping view is generated based on the position change. Here, the source position before the shard change may include address(es) of the source shard(s) and address(es) of the unprocessed object(s) in the source shard(s). From the checkpoint as illustrated in Table 1, the shard may be determined as "[0,536870911]," and the address of the unprocessed object(s) may be found based on the position "105" of the last processed object. Due to objects in any shards being processed in a continuous manner, the source position of the first unprocessed object may be determined as 105+1=106.

Further, the destination position after the shard change may be determined based on address(es) of destination shard(s) and address(es) of the unprocessed object(s) in the destination shard(s) after the change. Here, the destination shard(s) refers to shard(s) in the plurality of shards where the at least one unprocessed object is located after the change. It is to be understood that three types of changes may occur in the database system 410, and thus the destination position(s) may be determined based on different resharding procedures triggered by the diffident types of changes. With these embodiments, the destination position(s) may be determined in an accurate and effective manner In embodiments of the present invention, a type of the shard change that is associated with the shard may be determined. As shown in FIG. 5, the change 530 may relate to any of the splitting type 532, the merging type 534, and the moving type 536. Here, the type may be determined based on a resharding rule that is adopted by the database system 410. For example, if the workload of the shard is heavy, the shard may be split into two shards for reducing the workload. In another example, if the data amount in two shards is low, the two shards may be merged into one shard. The following paragraphs will provide more information about determining the destination position(s) of the at least one unprocessed object on the corresponding destination shard subset after the shard change based on the type of the change. In embodiments of the present invention, based on a rule for splitting, the source shard may be split into two or more shards. In the scenario that the source shard is split into two shards, a first destination shard and a second destination shard that are generated from a split of the source shard may be determined. In the scenario that the source shard is split into three shards, it can be assumed that a third destination shard is split from either the first destination shard or the second destination shard.

Figure 7A:
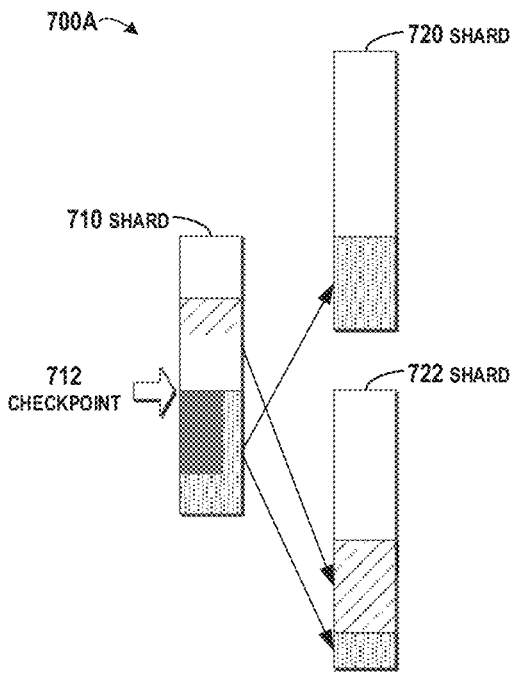
FIG. 7A depicts an example procedure for determining a mapping view after a split of a source shard, according to embodiments of the present invention.
Figure 7B:
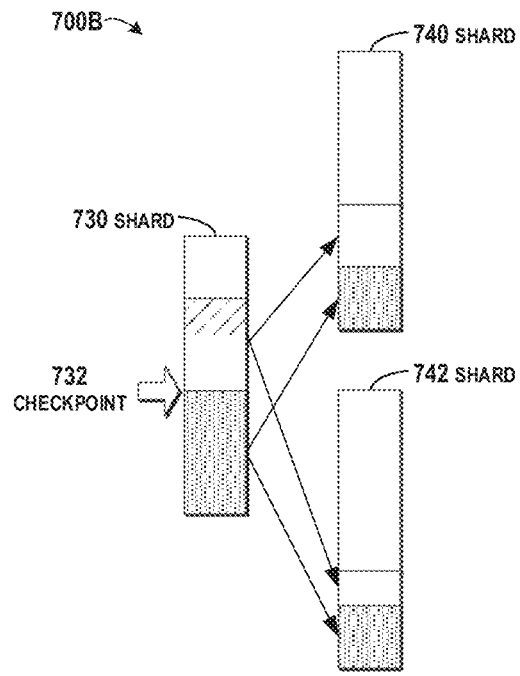
FIG. 7B depicts another example procedure for determining a mapping view after a split of a source shard, according to embodiments of the present invention.

Referring to FIGS. 7A and 7B, two situations for the splitting procedure are depicted, respectively. Here, a splitting type indicates that a source shard of the at least one source shard is split into a first destination shard of the at least one destination shard and a second destination shard of the at least one destination shard. FIG. 7A depicts an example procedure 700A for determining a mapping view after a split of a source shard according to embodiments of the present invention. In FIG. 7A, a shard 710 related to a checkpoint 712 is split into a shard 720 that includes only processed objects and a shard 722 that includes unprocessed objects and processed objects. FIG. 7B shows another situation 700B, where a shard 730 with a checkpoint 732 is split into a shard 740 and a shard 742, here both of the shards 740 and 742 include unprocessed objects and processed objects.

In some embodiments, the unprocessed object(s) stored in the source shard may be compared respectively with object(s) stored in the first and second destination shards, such that the distribution of the unprocessed objects may be determined in the first and second destination shards. Specifically, a first portion of the unprocessed object(s) and a second portion of unprocessed object(s) stored in the first and second destination shards are identified, respectively. Further, the destination position on the first destination shard and the destination position on the second destination shard are determined based on the first portion of unprocessed object(s) and the second portion of unprocessed object(s) respectively stored in the first and second destination shards. Referring to FIG. 7A for more details about determining the destination positions, all the unprocessed objects are stored in the shard 722. At this point, the mapping view may be determined according to the unprocessed objects in the shard 722. In one example, the checkpoint 712 may include: "[{"source_checkpoint": {"shard": "80-9f","seq": 123}}]" and the mapping view for the shard 722 may be represented in Table 3.

TABLE 3

Example Mapping View

{"checkpoints": [{"source_checkpoint": {"shard": "shard1","seq": 123}, "target_checkpoint": [{"shard": "shard2","seq": 72}, {"shard": "shard3","seq": 51}]}]}

In Table 3, "checkpoints" indicate that following data describes checkpoint changes, in which "source_checkpoint" indicates details about the source checkpoint (contents in this field are similar to those described in Table 1) and "target_checkpoint" indicates details about the destination checkpoint(s). Here, the shard 710 is split into the shards 720 and 722, therefore, two fields {"shard": "shard2", "seq": 72}, (due to "72" points to the last processed, here "72" points to the last non-null object, and thus "72" indicates the shard 720 includes no unprocessed object) and {"shard": "shard3","seq": 51} (the first unprocessed locates at the position 51+1=52) are added into the mapping view. The mapping view in Table 3 shows that after the split, the source shard 710 is split into two destination shards 720 and 722, and the checkpoint 712 related to one shard is converted into an updated checkpoint related to two shards (one of them is empty).

In some embodiments of the present invention, users are allowed to register to the checkpoint management service as described above, and a registered user may enjoy use of the checkpoint management service. At this point, the mapping view may be modified to include the registered information followed by "registered_user" in Table 4.

TABLE 4

Example Mapping View

{"registered_user": "user1", "other_metadata": "other_metadata", "checkpoints": [{"source_checkpoint": {"shard": "shard1","seq": 123}, "target_checkpoint": [{"shard": "shard2","seq": 72}, {"shard": "shard3","seq": 51}]}]}

In FIG. 7B, the unprocessed objects are stored in both of the shards 740 and 742. At this point, the mapping view may be determined according to the unprocessed objects in the shards 740 and 742. In one example, the mapping view for the shard 730 represented in Table 5 may be determined. Here, the shard 730 is split into the shards 740 and 742, and two fields {"shard": "80-8f","seq": 62} (which indicates that the last processed object locates at the position "62") and {"shard": "90-9f","seq":61} (which indicates that the last processed object locates at the position "61") are added into the mapping view. The mapping view in Table 5 shows that after the split, the source shard 730 is split into two shards 740 and 742, and the checkpoint 732 is converted into the updated checkpoint.

TABLE 5

Example Mapping View

{"checkpoints": [{"source_checkpoint": {"shard": "80-9f","seq": 123}, "target_checkpoint": [{"shard": "80-8f","seq": 62}, {"shard": "90-9f","seq": 61}]}]}

In embodiments of the present invention, the change may relate to a merging type, where a source shard and a further source shard are merged into a destination shard. Based on a rule for merging, two or more shards may be merged into one, and the merging operation may involve a plurality of situations. The following paragraphs will describe the merging operation by taking an example of two source shards being merged into one destination shard, which includes two situations. Alternatively and/or in addition to, more than two source shards may be merged into one destination shard. For example, in a situation where three source shards are merged together, a first source shard and a second source shard are merged into one temporary shard, and the temporary shard and a third source shard are merged into the destination shard. So, the details for merging more than two source shards will be omitted.

In a first situation, the unprocessed objects may be stored in only one source shard. At this point, the destination position on the destination shard may be determined directly based on addresses of unprocessed object(s) on the destination shard after the merging operation.

Figure 8A:
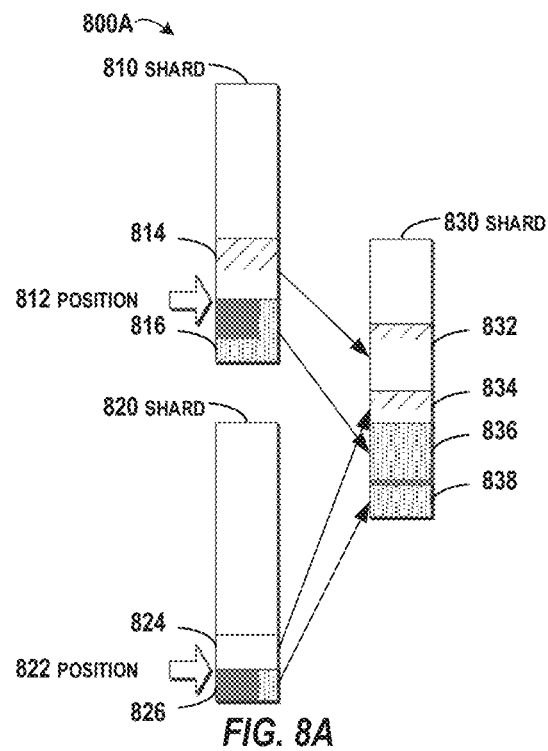
FIG. 8A depicts another example procedure for determining a mapping view after a merge of a source shard and a further source shard, according to embodiments of the present invention.
Figure 8B:
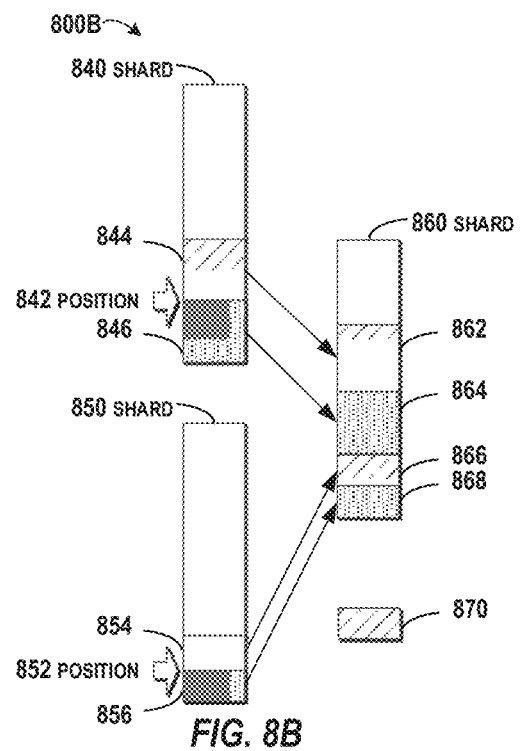
FIG. 8B depicts another example procedure for determining a mapping view after a merge of a source shard and a further source shard, according to embodiments of the present invention.

In a second situation, both source shards may include unprocessed objects (FIGS. 8A and 8B relate to the second situation), therefore the destination position on the destination shard may be determined based on an first address of unprocessed object(s) (from the source shard) on the destination shard and an second address of unprocessed object(s) (from the further source shard) on the destination shard after a merge of the further source shard and the source shard. The second situation may be further divided into two cases: 1) the unprocessed objects in shards 810 and 820 are stored continuously in the destination shard (as shown in FIG. 8A); and 2) the unprocessed objects in shards 840 and 850 are stored discontinuously in the destination shard (as shown in FIG. 8B). At this point, a first portion of unprocessed object(s) on the source shard and a second portion of unprocessed object(s) on the further source shard are identified, respectively. Unprocessed object(s) stored on both the source shard and the further source shard are compared with object(s) stored on the destination shards, so as to identify the first portion of unprocessed object(s) stored on the destination shard and the second portion of unprocessed object(s) stored on the destination shard. Further, the destination position(s) on the destination shard is determined based on the first portion of unprocessed object(s) stored on the destination shard and the second portion of unprocessed object(s) stored on the destination shard.

FIG. 8A depicts an example procedure 800A for determining a mapping view after a merge of a source shard and a further source shard according to embodiments of the present invention. In FIG. 8A, a checkpoint includes a position 812 and a position 822, here the checkpoint relates to the shards 810 (in which the objects are divided into unprocessed objects 814 and processed objects 816 at the position 812) and the shard 820 (in which the objects are divided into unprocessed objects 824 and processed objects 826 at the position 822). After the merging operation, the unprocessed objects 814 and the unprocessed objects 824 become the unprocessed objects 832 and the unprocessed objects 834 on the destination shard 830, respectively. The processed objects 816 and the processed objects 826 become the processed objects 836 and the processed objects 838 on the destination shard 830, respectively.

As shown, the unprocessed objects 832 and 834 are stored continuously, and then the destination position on the destination shard may be determined based on an address of the unprocessed objects 832 and 834 on the destination shard 830. In order to determine the destination position on the destination shard shown in FIG. 8A, a portion of unprocessed object(s) stored on the destination shard is selected from the first portion of unprocessed object(s) stored on the destination shard and the second portion of unprocessed object(s) stored on the destination shard based on positions of the first portion and the second portion of unprocessed object(s) stored on the destination shard. Then, the destination position is determined based on the selected portion of unprocessed object(s) stored on the destination shard.

In FIG. 8A, the unprocessed objects 834 follows the processed objects 836, and then the end address of the processed objects 836 may be determined as the destination position. Specifically, the mapping view in Table 6 shows that after the merge operation, the source shards 810 and 820 are merged into the shard 830, and a checkpoint (including the positions 812 and 822) is converted into an updated checkpoint (related to the shard 830) in which an end address of the processed objects 836 is indicated.

TABLE 6

Example Mapping View

{"registered_user": "user1", "other_metadata": "other_metadata",
"checkpoints": [{"source_checkpoint": [{"shard": "c0-df","seq": 43}, {"shard": "e0-ff","seq": 63}]},
"target_checkpoint": {"shard": "c0-ff","seq": 106}}]}

In embodiments of the present invention, the unprocessed objects may be stored discontinuously in the destination shard, and reference will be made to FIG. 8B for more details. In example procedure 800B of FIG. 8B, after the merging operation, the unprocessed objects 844 and the unprocessed objects 854 become the unprocessed objects 862 and the unprocessed objects 866 in the destination shard 860, respectively. The processed objects 846 and the processed objects 856 become the processed objects 864 and the processed objects 868 in the destination shard 860, respectively. As shown, the unprocessed objects 862 and 866 are stored discontinuously, and then the destination position on the destination shard 840 may be determined based on end addresses of the processed objects 864 and 868 in the destination shard 860.

In order to determine the destination position on the destination shard 860 shown in FIG. 8B, a portion of unprocessed object(s) on the destination shard is selected from the first portion of unprocessed object(s) stored on the destination shard and the second portion of unprocessed object(s) stored on the destination shard based on positions of the first portion and the second portion of unprocessed object(s) stored on the destination shard. Then, the destination position is determined based on the selected portion of unprocessed object(s) on the destination shard, such that unprocessed object(s) is selected from the destination position on the destination shard. In FIG. 8B, the processed objects 868, the unprocessed objects 866, the processed objects 864, and the unprocessed objects 862 are continuous in the shard 860, and then the addresses of the unprocessed objects 866 and 862 may be determined as the destination position. Specifically, the mapping view in Table 7 shows that after the merge operation, the source shards 840 and 850 are merged into the destination shard 860, and a checkpoint (including positions 842 and 852) is converted into updated checkpoint (related to the shard 860): {"shard": "c0-ff", "seq":112}. Further, extra unprocessed object(s) are selected from the destination position on the destination shard 860, and the selected extra unprocessed object(s) 866 is included as extra information of the mapping view. In Table 7, "missing_rev" represents the extra unprocessed objects 866.

TABLE 7

Example Mapping View

{"registered_user": "user1", "other_metadata": "other_metadata",
"checkpoints": [{"source_checkpoint": [{"shard": "c0-df","seq": 43}, {"shard": "e0-ff","seq": 63}],
"target_checkpoint": {"shard": "c0-ff","seq": 112},
"missing_rev": "6f7cde"}]}

It is to be understood that FIG. 8B just provides an example procedure for determining a mapping view for a specific user who has the checkpoint related to the source shards 840 and 850, which are merged into the destination shard 860. In some embodiments, another user may have different checkpoints related to the shards 840 and 850. At this point, each user may be allocated with a storage space for identifying his/her extra unprocessed objects 866. For example, a storage space 870 may be allocated to the user, and the storage space 870 may record the start and end addresses of the extra unprocessed objects 866. Alternatively and/or in addition to, the storage space 870 may record the start address of the extra unprocessed objects 866 and the number of the extra unprocessed objects 866.

Figure 9:
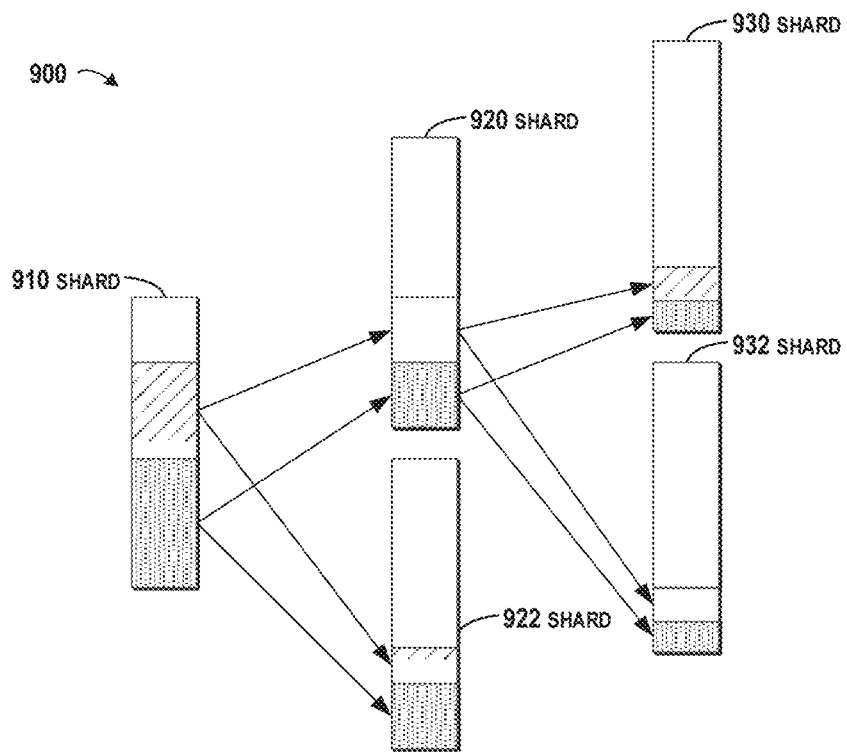
FIG. 9 depicts an example procedure for determining a mapping view after a combined split of a source shard, according to embodiments of the present invention.

The above paragraphs have described determinations of the mapping view after the splitting operation and the merging operation. In some embodiments of the present invention, the splitting operation and the merging operation may be implemented repeatedly. For example, a splitting operation may be followed by another splitting operation. FIG. 9 depicts an example procedure 900 for determining a mapping view after a combined split of a source shard according to embodiments of the present invention. In FIG. 9, the shard 910 is subject to two splitting operations, where the shard 910 is first split into a shard 920 and a shard 922, and then the shard 920 is split into a shard 930 and a shard 932. Rules for determining the mapping view are the same as described in the above paragraphs. The mapping view after the first splitting operation is shown in Table 8, where the checkpoint related to the shard 910 is converted into a temporary checkpoint related to the shards 920 and 922.

TABLE 8

Example Mapping View

{"registered_user": "user1", "other_metadata": "other_metadata",
"checkpoints": [{"source_checkpoint": {"shard": "80-9f","seq": 123},
"target_checkpoint": [{"shard": "80-8f","seq": 62}, {"shard": " 90-9f","seq": 61}]}]}

Further, the mapping view after the second splitting operation is shown in Table 9. In Table 9, the last three lines show that the shard 920 is further split into the shards 930 and 932, and thus the temporary checkpoint for the shard 920 is converted into an updated checkpoint related to the shards 930 and 932. In total, there may be three new sub-checkpoints: {"shard": "80-87","seq":32}, "shard": "88-8f," "seq": 31, and {"shard": "90-9f","seq": 61} in the updated checkpoint.

TABLE 9

Example Mapping View

{"registered_user": "user1", "other_metadata": "other_metadata",
"checkpoints": [{"source_checkpoint": {"shard": "80-9f","seq": 123},
"target_checkpoint": [{"shard ": "80-8f","seq": 62}, {"shard": "90-9f","seq": 61}]},
{"source_checkpoint": {"shard": "80-8f","seq": 62},
"target_checkpoint": [{"shard": "80-87","seq": 32}, {"shard": "88-8f","seq": 31}]}]}

Figure 10:
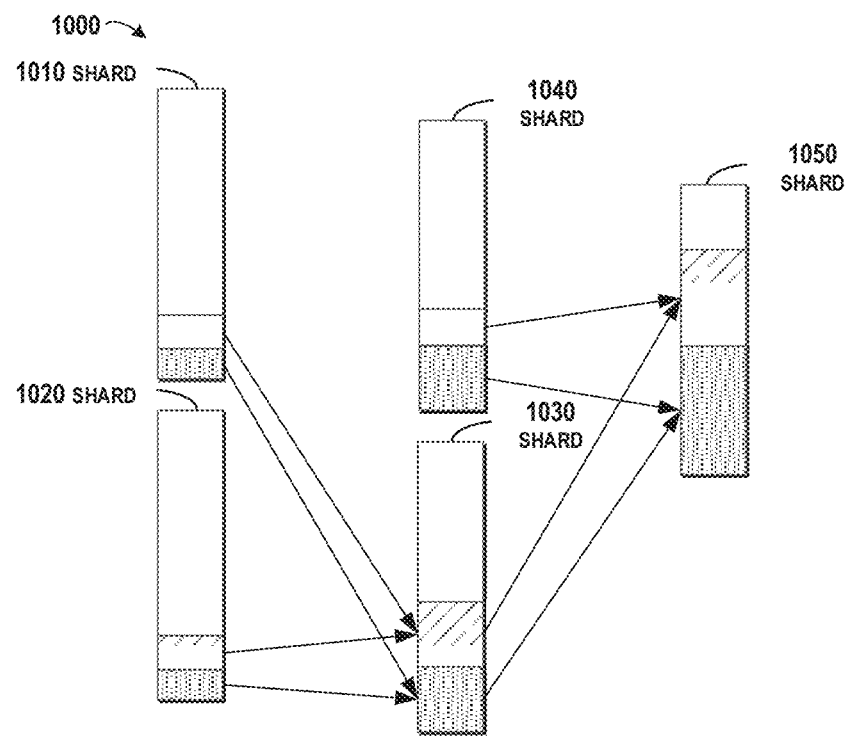
FIG. 10 depicts an example procedure for determining a mapping view after a combined merge of a source shard, according to embodiments of the present invention.

In some embodiments of the present invention, a merging operation may be followed by another merging operation. FIG. 10 depicts an example procedure 1000 for determining a mapping view after a combined merging of a source shard according to embodiments of the present invention. In FIG. 10, shards 1010 and 1020 are subject to two merging operations, where the shard 1010 is first merged with the shard 1020 into a shard 1030, next the shard 1030 is further merged with the shard 1040 into a shard 1050. The mapping view after the first merging operation is shown in Table 10, where a checkpoint related to the shards 1010 and 1020 is converted into a temporary checkpoint related to the shard 1030.

TABLE 10

Example Mapping View

{"registered_user": "user1", "other_metadata": "other_metadata",
"checkpoints": [{"source_checkpoint": [{"shard": "c0-df","seq": 43}, {"shard": "e0-ff","seq": 63}],
"target_checkpoint": {"shard": "c0-ff","seq": 106}}]}

Further, the mapping view after the second merging operation is shown in Table 11. In Table 11, the last three lines show that the shards 1030 and 1040 are further merged into the shard 1050, and thus the temporary checkpoint related to the shards 1010 and 1020 is converted into an updated checkpoint related to the shard 1050, i.e., the checkpoint: {"shard": "a0-ff","seq": 208}.

TABLE 11

Example Mapping View

{"registered_user": "user1", "other_metadata": "other_metadata",
"checkpoints": [{"source_checkpoint": [{"shard": "c0-df","seq": 43}, {"shard": "e0-ff","seq": 63}],
"target_checkpoint": {"shard": " c0-ff","seq": 106}},
{"source_checkpoint": [{"shard": "c0-ff","seq": 106}, {"shard": "a0-bf","seq": 102}],
"target_checkpoint": {"shard": " a0-ff","seq": 208}}]}

It is to be understood that the above paragraphs only show the situation of two splitting operations and two merging operations. Alternatively and/or in addition to, a split operation may be followed by a merging operation, and a merging operation may be followed by a splitting operation. Rules for determining the mapping view are the same as described in the above, and details may be omitted.

Figure 11:
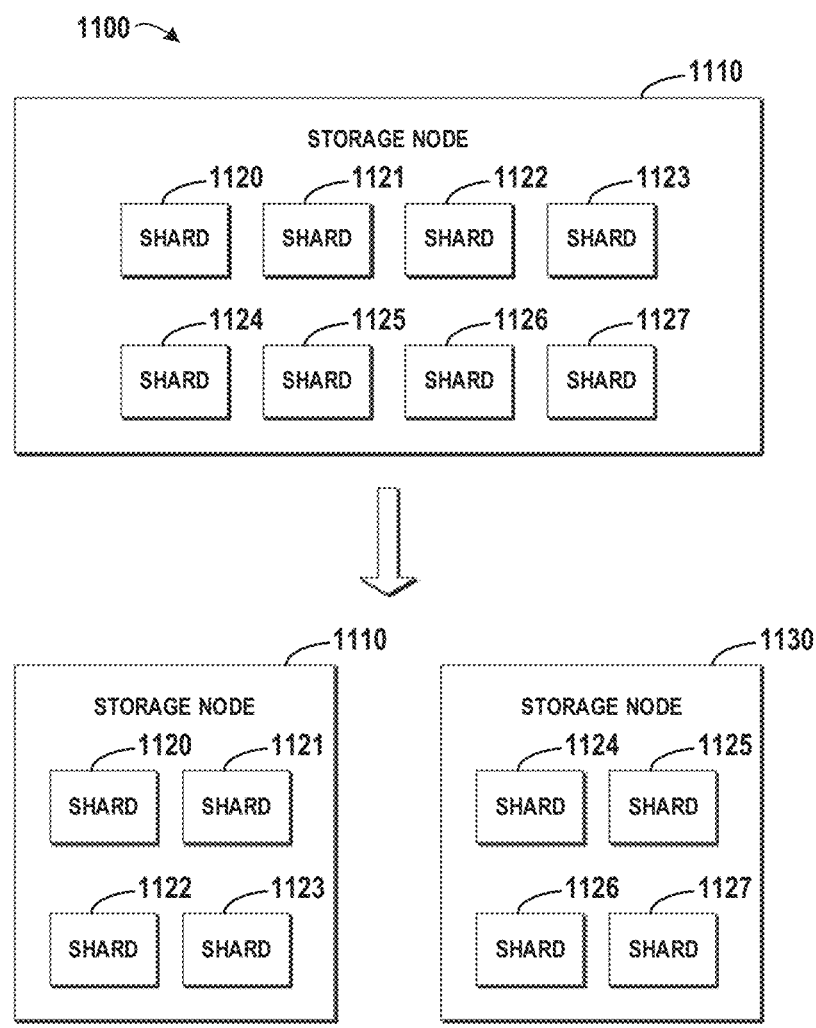
FIG. 11 depicts an example procedure for determining a mapping view after a move of a source shard, according to embodiments of the present invention.

In embodiments of the present invention, the change may relate to a moving type for moving the source shard from a source storage node in the database system to a destination storage node in the database system. Reference will be made to FIG. 11 for more details, which depicts an example procedure 1100 for determining a mapping view after a move of a source shard according to embodiments of the present invention. FIG. 11 shows a storage node 1110 comprised in the database system, here the storage node 1110 (named as "node1") comprises the shards 1120, 1121, 1122, 1123, 1124, 1125, 1126, and 1127 (named as "shard0" to "shard7," respectively). The mapping view in Table 12 shows a mapping view related to shards of the user before movement. As shown in Table 12, a checkpoint related to the shard with an ID of "shard4 (corresponding to shard 1124)" is defined.

TABLE 12

Example Mapping View

{"registered_user": "user1", "other_metadata": "other_metadata",
"checkpoints": [{"source_checkpoint": {"shard": "shard4", "node": "node1", "seq": 32},
"target_checkpoint": ""}]}

After the moving operation, some shards in the storage node 1110 may be moved to another storage node. For example, the shards 1124 to 1127 are moved to the storage node 1130 (named as "node2"). In order to determine the mapping view, unprocessed object(s) stored on the source shard related to a checkpoint is compared with object(s) stored on the destination shard, so as to identify a portion of unprocessed object(s) stored on the destination shard. Then, the destination position of unprocessed object(s) stored on the destination shard is determined based on the identified portion of unprocessed object(s) stored on the destination shard. At this point, after the moving operation, the mapping view related to "shard4" is shown in Table 13.

TABLE 13

Example Mapping View

{"registered_user": "user1", "other_metadata": "other_metadata",
"checkpoints": [{"source_checkpoint": {"shard": "shard4", "node": "node1",
"seq": 32},
"target_checkpoint": [{"shard": "shard4", "node": "node2","seq": 32}]}]}

The above paragraphs have provided details about determining the mapping view, by using the mapping view, an updated checkpoint may be determined for continuing the unfinished processing. Referring back to FIG. 6, the checkpoint updater 626 determines an updated checkpoint for indicating the at least one destination position of the unprocessed object(s) of the plurality of objects on the at least one destination shard in the database system based on the mapping view. Specifically, in the mapping view, data that follows "target_checkpoint" may be extracted. Taking the mapping view in Table 5 as an example, after the splitting operation, the updated checkpoint includes: {"shard": "80-8f","seq": 62} and {"shard": "90-9f","seq": 61}. At this point, unprocessed objects that are represented by the updated checkpoint may be provided to the user, and the user may continue to read the unread reports. With these embodiments, even if the shard(s) related to the checkpoint defined by the user changes, the updated checkpoint may still work in the database system after the change. Compared with the existing solution where the checkpoint cannot work after the shard change, the updated checkpoint may provide more effective management in the database system.

The present invention may be a system, a method, and/or a computer program product at any possible technical detail level of integration. The computer program product may include a computer readable storage medium (or media) having computer readable program instructions thereon for causing a processor to carry out aspects of the present invention.

Figure 12:
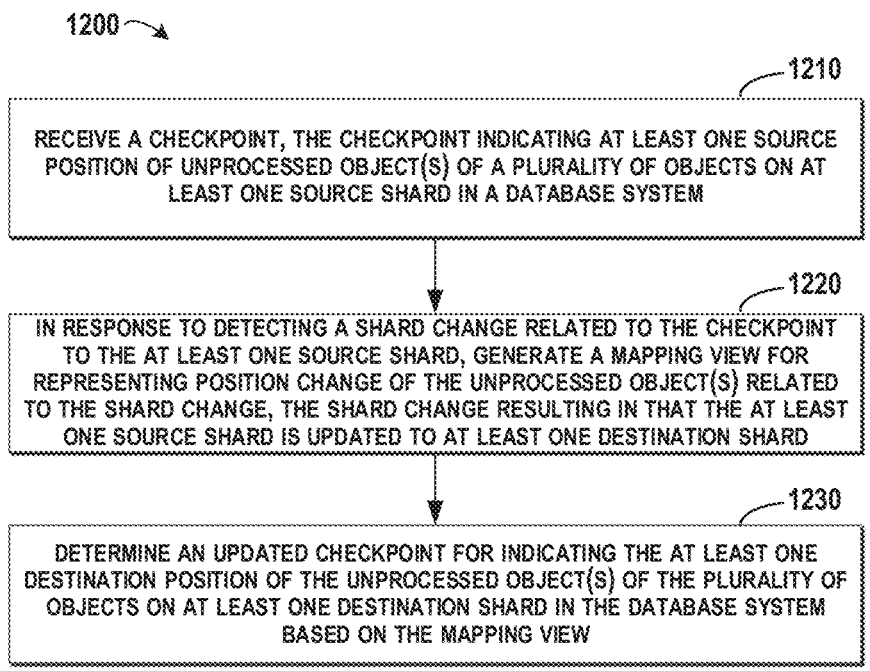
FIG. 12 depicts a flowchart of an example method for managing a checkpoint in a database system, according to embodiments of the present invention.

Reference will be made to FIG. 12 for more details about embodiments of the present invention. FIG. 12 depicts a flowchart of an example method 1200 for managing checkpoints in a database system according to embodiments of the present invention. At block 1210, a checkpoint is received, the checkpoint indicating at least one source position of unprocessed object(s) of a plurality of objects on at least one source shard in a database system. A shard change related to the checkpoint to the at least one source shard is detected, and the shard change results in that the at least one source shard is updated to at least one destination shard. At block 1220, in response to the shard change, a mapping view for representing position change of the unprocessed object(s) related to the shard change. At block 1230, an updated checkpoint is determined for indicating the at least one destination position of the unprocessed object(s) of the plurality of objects on at least one destination shard in the database system based on the mapping view.

At block 1220, more steps may be implemented for obtaining the mapping view. Specifically, a source shard subset of the at least one source shard and a corresponding destination shard subset of the at least one destination shard related to the shard change are obtained based on information related to the shard change, the information comprising a type of shard change and addresses of the source and corresponding destination shard subsets. Then, source position(s) of unprocessed object(s) on the source shard subset before the change is determined based on the checkpoint, and destination position(s) of unprocessed object(s) on the corresponding destination shard subset after the shard change is determined based on the information related to the shard change. Further, the mapping view is generated based on a position change between the source position and the destination position.

Further, in order to determine the destination position(s) of unprocessed object(s) on the corresponding destination shard subset after the shard change based on the information related to the shard change, the type of the shard change is determined, and then the destination position(s) of unprocessed object(s) on the corresponding destination shard subset after the shard change is determined at least based on the type.

In some embodiments of the present invention, the type is a splitting type in which a source shard of the at least one source shard is split into a first destination shard of the at least one destination shard and a second destination shard of the at least one destination shard, unprocessed object(s) stored on the source shard is compared with object(s) stored on the first and second destination shards, respectively. Further, a first portion of unprocessed object(s) and a second portion of unprocessed object(s) respectively stored on the first and second destination shards are identified. Next, the destination position on the first destination shard and the destination position on the second destination shard are determined based on the first portion of unprocessed object(s) and the second portion of unprocessed object(s) respectively stored on the first and second destination shards.

In some embodiments of the present invention, the type is a merging type in which a source shard and a further source shard are merged into a destination shard, a first portion of unprocessed object(s) on the source shard and a second portion of unprocessed object(s) on the further source shard are identified respectively. Then, unprocessed object(s) stored on both the source shard and the further source shard are compared with object(s) stored on the destination shard for identifying the first portion of unprocessed object(s) stored on the destination shard and the second portion of unprocessed object(s) stored on the destination shard. Next, the destination position(s) of unprocessed object(s) on the destination shard is determined based on the first portion of unprocessed object(s) stored on the destination shard and the second portion of unprocessed object(s) stored on the destination shard.

In some embodiments of the present invention, it is determined that the first portion of unprocessed object(s) stored on the destination shard and the second portion of unprocessed object(s) stored on the destination shard are stored continuously. Then, from the first portion of unprocessed object(s) stored on the destination shard and the second portion of unprocessed object(s) stored on the destination shard, a portion of unprocessed object(s) stored on the destination shard is selected based on positions of the first portion and the second portion on the destination shard. Next, the destination position is determined based on the selected portion of unprocessed object(s) stored on the destination shard.

In some embodiments of the present invention, it is determined that the first portion of unprocessed object(s) stored on the destination shard and the second portion of unprocessed object(s) stored on the destination shard are stored discontinuously. At this point, from the first portion of unprocessed object(s) stored on the destination shard and the second portion of unprocessed object(s) stored on the destination shard, a portion of unprocessed object(s) stored on the destination shard is selected based on positions of the first portion and the second portion of unprocessed object(s) stored on the destination shard. Then, the destination position is determined based on the selected portion on the destination shard, and extra unprocessed object(s) is selected from the destination position on the destination shard. Further, the selected extra unprocessed object(s) is included as extra information of the mapping view.

In some embodiments of the present invention, the type is a moving type in which a source shard on a source node is moved to a destination shard on a destination node in the database system, unprocessed object(s) stored on the source shard is compared with object(s) stored on the destination shard. A portion of unprocessed object(s) stored on the destination shard is identified, and then the destination position is determined based on the identified portion of unprocessed object(s) stored on the destination shard.

In some embodiments of the present invention, the plurality of objects is processed continuously, and a position of at least one unprocessed objects on a shard indicates an address of a last processed object of the plurality of objects, and a first object in the at least one unprocessed object is immediately subsequent to the last processed object. Further, the at least one unprocessed object is processed based the updated checkpoint.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by one or more processors, a checkpoint, the checkpoint indicating at least one source position of one or more unprocessed objects of a plurality of objects on at least one source shard in a database system;
    in response to detecting a shard change related to the checkpoint to the at least one source shard, the shard change resulting in that the at least one source shard is updated to at least one destination shard, generating, by the one or more processors, a mapping view for representing a position change of the one or more unprocessed objects related to the shard change; and
    determining, by the one or more processors, an updated checkpoint for indicating at least one destination position of the one or more unprocessed objects of the plurality of objects on the at least one destination shard in the database system based on the mapping view.

2. The computer-implemented method of claim 1, wherein generating the mapping view comprises:
    obtaining, by the one or more processors, a source shard subset of the at least one source shard and a corresponding destination shard subset of the at least one destination shard related to the shard change based on information related to the shard change, the information comprising a type of shard change and addresses of the source shard subset and corresponding destination shard subset;
    determining, by the one or more processors, one or more source positions of one or more unprocessed objects on the source shard subset before the shard change based on the checkpoint;
    determining, by the one or more processors, one or more destination positions of one or more unprocessed objects on the corresponding destination shard subset after the shard change based on the information related to the shard change; and
    generating, by the one or more processors, the mapping view based on the position change between the at least one source position and the at least one destination position.

3. The computer-implemented method of claim 2, wherein determining the one or more destination positions of the one or more unprocessed objects on the corresponding destination shard subset after the shard change based on the information related to the shard change comprises:
    determining, by the one or more processors, the type of the shard change; and
    determining, by the one or more processors, the one or more destination positions of the one or more unprocessed objects on the corresponding destination shard subset after the shard change based, at least in part, on the type.

4. The computer-implemented method of claim 3, wherein determining the one or more destination positions of the one or more unprocessed object on the corresponding destination shard subset after the shard change based, at least in part, on the type comprises:
    in response to the type being a splitting type in which a source shard of the at least one source shard is split into a first destination shard of the at least one destination shard and a second destination shard of the at least one destination shard,
    comparing, by the one or more processors, one or more respective unprocessed objects stored on the source shard with respective objects stored on the first and second destination shards, respectively;
    identifying, by the one or more processors, a first portion of one or more unprocessed objects and a second portion of one or more unprocessed objects respectively stored on the first and second destination shards; and
    determining, by the one or more processors, a first destination position on the first destination shard and a second destination position on the second destination shard based on the first portion of one or more unprocessed objects and the second portion of one or more unprocessed objects respectively stored on the first and second destination shards.

5. The computer-implemented method of claim 3, wherein determining the one or more destination positions of the one or more unprocessed objects on the corresponding changed shard subset after the shard change based, at least in part, on the type comprises:
    in response to the type being a merging type in which a source shard and a further source shard are merged into a destination shard,
    identifying, by the one or more processors, a first portion of one or more unprocessed objects on the source shard and a second portion of one or more unprocessed objects on the further source shard, respectively;
    comparing, by the one or more processors, the one or more unprocessed objects stored on both the source shard and the further source shard with one or more objects stored on the destination shard;
    identifying, by the one or more processors, the first portion of one or more unprocessed objects stored on the destination shard and the second portion of one or more unprocessed objects stored on the destination shard; and determining, by the one or more processors, the one or more destination positions of one or more unprocessed objects on the destination shard based on the first portion of one or more unprocessed object) stored on the destination shard and the second portion of one or more unprocessed objects stored on the destination shard.

6. The computer-implemented method of claim 5, wherein determining the one or more destination positions comprises:

in response to determining that the first portion of one or more unprocessed objects stored on the destination shard and the second portion of one or more unprocessed objects stored on the destination shard are stored continuously, selecting, by the one or more processors, from the first portion of one or more unprocessed objects stored on the destination shard and the second portion of one or more unprocessed objects stored on the destination shard, a portion of one or more unprocessed objects stored on the destination shard based on positions of the first portion and the second portion on the destination shard; and determining, by the one or more processors, the destination position based on the selected portion of one or more unprocessed objects stored on the destination shard.

7. The computer-implemented method of claim 5, wherein determining the one or more destination positions comprises:

in response to determining that the first portion of one or more unprocessed objects stored on the destination shard and the second portion of one or more unprocessed objects stored on the destination shard are stored discontinuously, selecting, by the one or more processors, from the first portion of one or more unprocessed objects stored on the destination shard and the second portion of one or more unprocessed objects stored on the destination shard, a portion of one or more unprocessed objects stored on the destination shard based on positions of the first portion and the second portion of one or more unprocessed objects stored on the destination shard;

determining, by the one or more processors, the destination position based on the selected portion on the destination shard;

selecting, by the one or more processors, extra one or more unprocessed objects from the destination position on the destination shard; and including, by the one or more processors, the selected extra one or more unprocessed objects as extra information of the mapping view.

8. The computer-implemented method of claim 3, wherein determining the one or more destination positions of the one or more unprocessed objects on the corresponding destination shard subset after the shard change based, at least in part, on the type comprises:

in response to the type being a moving type in which a source shard on a source node is moved to a destination shard on a destination node in the database system, comparing, by the one or more processors, one or more unprocessed objects stored on the source shard with one or more objects stored on the destination shard;

identifying, by the one or more processors, a portion of one or more unprocessed objects stored on the destination shard; and determining, by the one or more processors, the destination position based on the identified portion of one or more unprocessed objects stored on the destination shard.

9. The computer-implemented method of claim 1, wherein the plurality of objects is processed continuously, a position of at least one unprocessed objects on a shard indicates an address of a last processed object of the plurality of objects, and a first object in the at least one unprocessed objects is immediately subsequent to the last processed object.

10. The computer-implemented method of claim 1, further comprising:

processing, by the one or more processors, the one or more unprocessed objects based the updated checkpoint.

11. A computer system, the computer system comprising:

one or more computer processors;
one or more computer readable storage media;
program instructions collectively stored on the one or more computer readable storage media for execution by at least one of the one or more computer processors, the stored program instructions that when executed by the one or more computer processors implements a method comprising:

receiving a checkpoint, the checkpoint indicating at least one source position of one or more unprocessed objects of a plurality of objects on at least one source shard in a database system;

in response to detecting a shard change related to the checkpoint to the at least one source shard, the shard change resulting in that the at least one source shard is updated to at least one destination shard, generating a mapping view for representing a position change of the one or more unprocessed objects related to the shard change; and determining an updated checkpoint for indicating at least one destination position of the one or more unprocessed objects of the plurality of objects on the at least one destination shard in the database system based on the mapping view.

12. The computer system of claim 11, wherein generating the mapping view comprises:

obtaining a source shard subset of the at least one source shard and a corresponding destination shard subset of the at least one destination shard related to the shard change based on information related to the shard change, the information comprising a type of shard change and addresses of the source shard subset and corresponding destination shard subset;

determining one or more source positions of one or more unprocessed objects on the source shard subset before the shard change based on the checkpoint;

determining one or more destination positions of one or more unprocessed objects on the corresponding destination shard subset after the shard change based on the information related to the shard change; and generating the mapping view based on the position change between the at least one source position and the at least one destination position.

13. The computer system of claim 12, wherein determining the one or more destination positions of the one or more unprocessed objects on the corresponding destination shard subset after the shard change based on the information related to the shard change comprises:
    determining the type of the shard change; and
    determining the one or more destination positions of the one or more unprocessed objects on the corresponding destination shard subset after the shard change based, at least in part, on the type.

14. The computer system of claim 13, wherein determining the one or more destination positions of the one or more unprocessed object on the corresponding destination shard subset after the shard change based, at least in part, on the type comprises:
    in response to the type being a splitting type in which a source shard of the at least one source shard is split into a first destination shard of the at least one destination shard and a second destination shard of the at least one destination shard,
        comparing one or more respective unprocessed objects stored on the source shard with respective objects stored on the first and second destination shards, respectively;
        identifying a first portion of one or more unprocessed objects and a second portion of one or more unprocessed objects respectively stored on the first and second destination shards; and
        determining a first destination position on the first destination shard and a second destination position on the second destination shard based on the first portion of one or more unprocessed objects and the second portion of one or more unprocessed objects respectively stored on the first and second destination shards.

15. The computer system of claim 13, wherein determining the one or more destination positions of the one or more unprocessed objects on the corresponding changed shard subset after the shard change based, at least in part, on the type comprises:
    in response to the type being a merging type in which a source shard and a further source shard are merged into a destination shard,
        identifying a first portion of one or more unprocessed objects on the source shard and a second portion of one or more unprocessed objects on the further source shard, respectively;
        comparing the one or more unprocessed objects stored on both the source shard and the further source shard with one or more objects stored on the destination shard;
        identifying the first portion of one or more unprocessed objects stored on the destination shard and the second portion of one or more unprocessed objects stored on the destination shard; and
        determining the one or more destination positions of one or more unprocessed objects on the destination shard based on the first portion of one or more unprocessed object) stored on the destination shard and the second portion of one or more unprocessed objects stored on the destination shard.

16. The computer system of claim 13, wherein determining the one or more destination positions of the one or more unprocessed objects on the corresponding destination shard subset after the shard change based, at least in part, on the type comprises:
    in response to the type being a moving type in which a source shard on a source node is moved to a destination shard on a destination node in the database system,
        comparing one or more unprocessed objects stored on the source shard with one or more objects stored on the destination shard;
        identifying a portion of one or more unprocessed objects stored on the destination shard; and
        determining the destination position based on the identified portion of one or more unprocessed objects stored on the destination shard.

17. A computer program product, the computer program product comprising a computer readable storage medium having program instructions embodied therewith, the program instructions executable by an electronic device to cause the electronic device to perform a method comprising:
    receiving a checkpoint, the checkpoint indicating at least one source position of one or more unprocessed objects of a plurality of objects on at least one source shard in a database system;
    in response to detecting a shard change related to the checkpoint to the at least one source shard, the shard change resulting in that the at least one source shard is updated to at least one destination shard, generating a mapping view for representing a position change of the one or more unprocessed objects related to the shard change; and
    determining an updated checkpoint for indicating at least one destination position of the one or more unprocessed objects of the plurality of objects on the at least one destination shard in the database system based on the mapping view.

18. The computer program product of claim 17, wherein generating the mapping view comprises:
    obtaining a source shard subset of the at least one source shard and a corresponding destination shard subset of the at least one destination shard related to the shard change based on information related to the shard change, the information comprising a type of shard change and addresses of the source shard subset and corresponding destination shard subset;
    determining one or more source positions of one or more unprocessed objects on the source shard subset before the shard change based on the checkpoint;
    determining one or more destination positions of one or more unprocessed objects on the corresponding destination shard subset after the shard change based on the information related to the shard change; and
    generating the mapping view based on the position change between the at least one source position and the at least one destination position.

19. The computer program product of claim 18, determining the one or more destination positions of the one or more unprocessed objects on the corresponding destination shard subset after the shard change based on the information related to the shard change comprises:
    determining the type of the shard change; and
    determining the one or more destination positions of the one or more unprocessed objects on the corresponding destination shard subset after the shard change based, at least in part, on the type.

20. The computer program product of claim 19, wherein the plurality of objects is processed continuously, a position of at least one unprocessed objects on a shard indicates an address of a last processed object of the plurality of objects, and a first object in the at least one unprocessed objects is immediately subsequent to the last processed object.

* * * * *